United States Patent
Kucherov et al.

(10) Patent No.: US 10,853,221 B2
(45) Date of Patent: Dec. 1, 2020

(54) PERFORMANCE EVALUATION AND COMPARISON OF STORAGE SYSTEMS

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 350 days.

(21) Appl. No.: 15/971,445

(22) Filed: May 4, 2018

(65) Prior Publication Data

US 2019/0340096 A1 Nov. 7, 2019

(51) Int. Cl.
*G06F 11/34* (2006.01)
*G06F 11/30* (2006.01)

(52) U.S. Cl.
CPC ...... *G06F 11/3452* (2013.01); *G06F 11/3006* (2013.01); *G06F 11/3428* (2013.01); *G06F 11/3433* (2013.01); *G06F 11/3447* (2013.01)

(58) Field of Classification Search
USPC ........................................................ 702/186
See application file for complete search history.

(56) References Cited

U.S. PATENT DOCUMENTS

| | | | |
|---|---|---|---|
| 6,496,908 B1 | 12/2002 | Kamvysselis et al. | |
| 6,553,464 B1 | 4/2003 | Kamvysselis et al. | |
| 6,640,280 B1 | 10/2003 | Kamvysselis et al. | |
| 6,691,067 B1 * | 2/2004 | Ding | G06F 11/3447 |
| | | | 702/186 |
| 6,862,632 B1 | 3/2005 | Halstead et al. | |
| 6,883,018 B1 | 4/2005 | Meiri et al. | |
| 6,886,164 B2 | 4/2005 | Meiri | |
| 6,898,685 B2 | 5/2005 | Meiri et al. | |
| 6,910,075 B2 | 6/2005 | Marshak et al. | |
| 6,938,122 B2 | 8/2005 | Meiri et al. | |
| 6,944,726 B2 | 9/2005 | Yoder et al. | |
| 6,968,369 B2 | 11/2005 | Veprinsky et al. | |
| 6,976,139 B2 | 12/2005 | Halstead et al. | |
| 7,000,086 B2 | 2/2006 | Meiri et al. | |

(Continued)

OTHER PUBLICATIONS

U.S. Appl. No. 16/050,247, filed Jul. 31, 2018, Schneider et al.

(Continued)

*Primary Examiner* — Paul D Lee
(74) *Attorney, Agent, or Firm* — Daly, Crowley Mofford & Durkee, LLP (57) ABSTRACT

Described embodiments provide storage system evaluation and comparison processes. An aspect includes sampling data points for a workload running on system over a sampling period. The data points indicate a performance metric with respect to operational characteristics of the system. An aspect further includes subtracting a system specification value from each of the averaged sampled data points, thereby producing deviation values reflecting a deviation of the sampled data points from the system specification value. An aspect also includes averaging the sampled data points, calculating a standard deviation of the averaged sampled data points, and dividing the variance value by the standard deviation, thereby producing a modified performance value that accounts for a deviation in the operational characteristics of the system over the sampling period.

20 Claims, 7 Drawing Sheets

(56) References Cited

U.S. PATENT DOCUMENTS

| | | |
|---|---|---|
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,468,180 B1 | 6/2013 | Meiri et al. |
| 8,578,204 B1 | 11/2013 | Ortenberg et al. |
| 8,600,943 B1 | 12/2013 | Fitzgerald et al. |
| 8,677,087 B2 | 3/2014 | Meiri et al. |
| 8,694,700 B1 | 4/2014 | Natanzon et al. |
| 8,706,959 B1 | 4/2014 | Arnon et al. |
| 8,719,497 B1 | 5/2014 | Don et al. |
| 8,732,124 B1 | 5/2014 | Arnon et al. |
| 8,782,357 B2 | 7/2014 | Halstead et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,914,596 B2 | 12/2014 | Lecrone et al. |
| 8,966,211 B1 | 2/2015 | Arnon et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,304,889 B1 | 4/2016 | Chen et al. |
| 9,323,750 B2 | 4/2016 | Natanzon et al. |
| 9,342,465 B1 | 5/2016 | Meiri |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,483,355 B1 | 11/2016 | Meiri et al. |
| 9,524,220 B1 | 12/2016 | Veprinsky et al. |
| 9,558,083 B2 | 1/2017 | LeCrone et al. |
| 9,606,739 B1 | 3/2017 | LeCrone et al. |
| 9,606,870 B1 | 3/2017 | Meiri et al. |
| 9,753,663 B1 | 9/2017 | LeCrone et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,055,161 B1 | 8/2018 | Meiri et al. |
| 10,095,428 B1 | 10/2018 | Meiri et al. |
| 10,152,527 B1 | 12/2018 | Meiri et al. |
| 2005/0122987 A1* | 6/2005 | Ignatowski ........... H04L 41/145 370/412 |
| 2012/0124318 A1* | 5/2012 | Bivens ................. G06F 11/3452 711/170 |
| 2012/0151276 A1* | 6/2012 | Bjorner ............... G06F 11/0751 714/47.1 |
| 2019/0121687 A1* | 4/2019 | Masuda .............. G06F 11/0709 |

OTHER PUBLICATIONS

U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 15/001,789, filed Jan. 20, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,188, filed Mar. 30, 2016, Meiri et al.
U.S. Appl. No. 15/499,297, filed Apr. 27, 2017, Kucherov et al.
U.S. Appl. No. 15/499,303, filed Apr. 27, 2017, Kucherov et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.

* cited by examiner

| System A | System B | System C |
|---|---|---|
| 100 | 100 | 100 |
| 100 | 60 | 130 |
| 100 | 100 | 67 |
| 100 | 60 | 78 |
| 100 | 100 | 88 |
| 100 | 60 | 127 |
| 100 | 100 | 130 |
| 100 | 60 | 77 |
| 100 | 100 | 88 |
| 100 | 60 | 88 |
| 60 | 100 | 127 |
| 100 | 60 | 130 |
| 100 | 100 | 67 |
| 100 | 60 | 78 |
| 100 | 100 | 88 |
| 100 | 60 | 127 |
| 100 | 100 | 72 |
| 100 | 60 | 89 |
| 100 | 100 | 105 |
| 100 | 60 | 73 |
| 100 | 100 | 78 |
| 100 | 60 | 88 |
| 100 | 100 | 127 |
| 100 | 60 | 72 |
| 100 | 100 | 89 |
| 100 | 60 | 105 |
| 100 | 100 | 88 |
| 100 | 60 | 127 |
| 100 | 100 | 130 |
| 100 | 60 | 67 |
| 100 | 100 | 78 |
| 60 | 60 | 88 |
| 100 | 100 | 127 |
| 100 | 60 | 130 |
| 100 | 100 | 67 |
| 100 | 60 | 78 |
| 100 | 100 | 88 |
| 100 | 60 | 127 |
| 100 | 100 | 130 |
| 100 | 60 | 77 |
| 100 | 100 | 78 |
| 100 | 60 | 88 |
| 100 | 100 | 88 |
| 100 | 60 | 127 |
| 100 | 100 | 138 |
| 100 | 60 | 145 |
| 98.26087 | 80 | 99 |
| 8.157245 | 20 | 24.22808 |
| 0.083016 | 0.25 | 0.244728 |

SPEC 90 } 306

|  | Average | K Value |
|---|---|---|
| A vs 90 | 8.26087 | 1.012703 — 314 |
| B vs 90 | -10 | -0.5 |
| C vs 90 | 9 | 0.37147 |

Note: While C has better average, it has a much lower K value due to jitter.

SPEC 80 } 308

|  | Average | K Value |
|---|---|---|
| A vs 80 | 18.26087 | 2.238608 |
| B vs 80 | 0 | 0 |
| C vs 80 | 19 | 0.784214 |

Note: While C has better average, it has a much lower K value due to jitter.

PERFORMANCE EVALUATION AND COMPARISON OF STORAGE SYSTEMS

BACKGROUND

When measuring system performance, a common approach is to look into the differences between the averages of the system's performance over time or between workloads of two or more different systems. This approach, however, does not take deviations from average into account but only their actual effect on the average. This means that the metric used to evaluate performance does not take into account inconsistent performance, which may be detrimental to the application behavior. For example, a system running for an hour with 100 KIOPS will have the same average as a system jumping between 111 KIOPS for nine minutes and dropping to one KIOPS for one minute, but in application perspective the second application's performance would be unacceptable by most standards (e.g., a virtual desktop freezing for one minute every ten minutes). Thus, while current approaches look to averages to determine overall system performance, they do not account for systems that may exhibit acceptable averages yet show high latency spikes.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for storage system evaluation and comparison processes. The method includes sampling data points for a workload running on system over a sampling period. The data points indicate a performance metric with respect to operational characteristics of the system. The method also includes subtracting a system specification value from each of the sampled data points, thereby producing deviation values reflecting a deviation of the sampled data points from the system specification value. The method further includes averaging the deviation values, calculating a standard deviation of the sampled data points, and dividing the averaged deviation values by the standard deviation, thereby producing a modified performance value that accounts for a deviation in the operational characteristics of the system over the sampling period.

Another aspect may provide a system including a memory having computer-executable instructions and a processor executing the computer-executable instructions. The computer-executable instructions when executed by the processor cause the processor to perform operations. The operations include sampling data points for a workload running on system over a sampling period. The data points indicate a performance metric with respect to operational characteristics of the system. The operations also include subtracting a system specification value from each of the sampled data points, thereby producing deviation values reflecting a deviation of the sampled data points from the system specification value. The operations further include averaging the deviation values, calculating a standard deviation of the sampled data points, and dividing the averaged deviation values by the standard deviation, thereby producing a modified performance value that accounts for a deviation in the operational characteristics of the system over the sampling period.

Another aspect may provide a computer program product embodied on a non-transitory computer readable medium, the computer program product including instructions that, when executed by a computer, causes the computer to perform operations. The operations include sampling data points for a workload running on system over a sampling period. The data points indicate a performance metric with respect to operational characteristics of the system. The operations also include subtracting a system specification value from each of the sampled data points, thereby producing deviation values reflecting a deviation of the sampled data points from the system specification value. The operations further include averaging the deviation values, calculating a standard deviation of the sampled data points, and dividing the averaged deviation values by the standard deviation, thereby producing a modified performance value that accounts for a deviation in the operational characteristics of the system over the sampling period.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

In embodiments, storage system performance evaluation and comparison processes are provided. The techniques described herein provide a way to evaluate system performance that account for any deviations in performance to provide a more realistic picture of the system's actual performance. In embodiments, the storage system performance evaluation and comparison process includes running a targeted system and collecting data points. The performance to be measured may be bandwidth when the workload running on the system is synthetic or known, or it could include a function of latency and performance. A specification (SPEC) is defined that identifies a minimum needed system performance (e.g., average workload or peak workload). The process performs a set of calculations:

$$K = AVG(Performance(SystemA) - SPEC)/Sqrt(Variance(Performance(SystemA))),$$

Whereby AVG is the average of all the samples taken for similar workloads,

Sqrt is a square root, and

Variance is the statistical variance.

A higher K value indicates that the system yields better performance in a more robust manner. A value below 0 means the system cannot meet the specification.

The numerator represents the average of deviations of the sampled data points from the spec. If it is negative, this means on average the performance is under the required specification. If it is positive, this means the performance is at least average. The higher this number, the more the system performance meets the required specification on average.

The denominator reflects the standard deviation. The lower the number is, the more consistent the system performance is. The higher the number, the less consistent the performance is. While the number may be zero (in very rare cases, representing a flat line performance), a value of 0.01, for example, could be used to reflect this scenario.

In embodiments, the storage system evaluation and comparison processes provide a way to compare system performance between two systems (e.g., taking jitter into account), or comparing system performance for the same system with different improvements/code levels. It also provides a way to compare the system's performance against a system specification.

Figure 1:
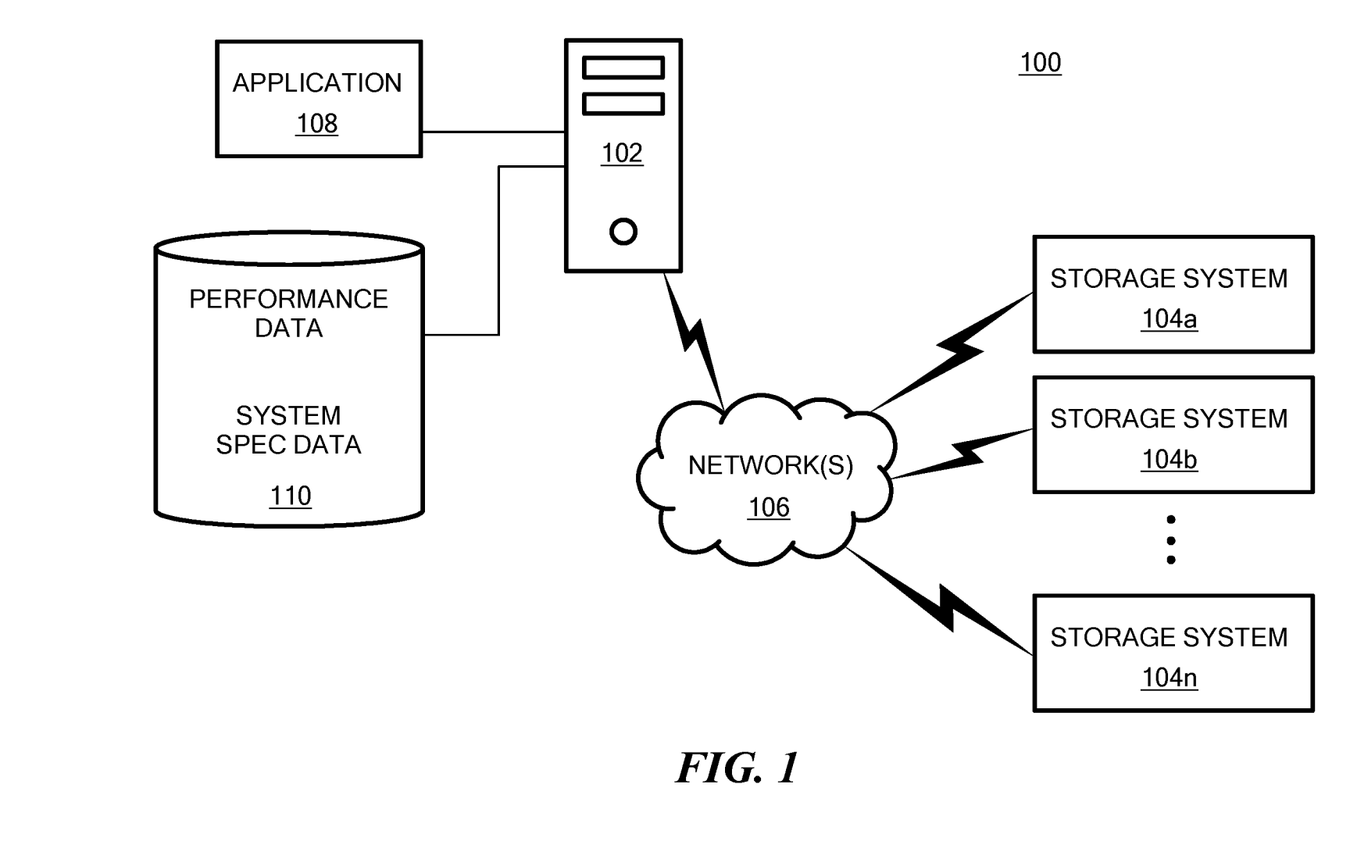
FIG. 1 is a block diagram of a system upon which storage system performance evaluation and comparison processes may be implemented in accordance with an embodiment.

Turning now to FIG. 1, a system 100 for implementing storage system performance evaluation and comparison processes will now be described according to embodiments. The system 100 includes a host system computer 102 and storage systems 104a-104n, each of which is communicatively coupled to one or more networks 106. The host system computer 104 may be implemented as one or more high-speed computer processing devices, such as one or more mainframe computers capable of handling a high volume of activities conducted on behalf of end users of the storage system performance evaluation and comparison processes. In one embodiment, as shown in FIG. 1, the host system computer 102 implements an application 108 to centrally manage the processes described herein.

In alternative embodiments, the host system computer 102 may be implemented as a general-purpose desktop or laptop computer. An end user may access a user interface (not shown) of the host system computer 102 via a web browser operating on the computer 102. The end user may send a request to one or more storage systems to initiate the storage system performance evaluation and comparison processes, as will be described further herein. It will be understood that the exemplary processes may be implemented via other devices, such as a wireless communication device (e.g., a smart phone, personal digital assistant, or tablet PC). Similar to the personal computer, the end user may access a user interface of the host system computer 102 via a web browser operating on the mobile device to initiate the processes described herein.

In one embodiment, the host system computer 102 may be implemented by an entity that operates the storage systems (e.g., a proprietary system). Alternatively, the host system computer 102 may be implemented by a third-party service provider that provides the storage system performance evaluation and comparison processes on behalf of the operator of the storage systems 104.

The networks 106 may be any type of known networks including, but not limited to, a wide area network (WAN), a local area network (LAN), a global network (e.g. Internet), a virtual private network (VPN), and an intranet. The networks 106 may be implemented using wireless networks or any kind of physical network implementation known in the art, e.g., using cellular, satellite, and/or terrestrial network technologies. The networks 106 may also include short range wireless networks utilizing, e.g., BLUETOOTH™ and WI-FI™ technologies and protocols.

Also shown in FIG. 1, a storage device 110 is directly coupled to the host system computer 102. Alternatively, the storage device 110 may be coupled to the host system computer 102 via one or more of the network(s) 106. The storage device 110 stores a variety of data used by the host system computer 102 in implementing the storage system performance evaluation and comparison processes described herein. As shown in FIG. 1, the storage device 110 stores performance data histories for one or more storage systems, as well as specification data. It is understood that the storage device 110 may be implemented using memory contained in the host system computer 102 or may be a separate physical device. The storage device 110 may be logically addressable as a consolidated data source across a distributed environment that includes the networks 106.

The host system computer 102 operates as a database server and coordinates access to application data including data stored in the storage device 110. The host system computer 102 may be implemented using one or more servers operating in response to a computer program stored in a storage medium accessible by the server. The host system computer 102 may operate as a network server (e.g., a web server) to communicate with any network entities.

Storage systems 104a-104n may be implemented as varying types of storage devices. For example, the storage systems 104a-104n may include one or more rotating magnetic storage devices, one or more rotating optical storage devices, and/or one or more solid state drives (SSDs), such as a flash drive. For example, the storage systems 104a-104n may include one or more hard disk drives (HDD), one or more flash drives, optical disks, as well as one or more other types of data storage devices. In other examples, the storage systems 104a-104n may include a set of one or more data storage arrays. A data storage array may be, for example, a redundant array of inexpensive disks (RAID) array, an optical storage array, or any other type of data storage array.

Turning now to FIGS. 2, 3, and 4A-4C, a process for implementing storage system performance evaluation and comparison processes, in conjunction with sampled data for three systems A, B, and C, as well as corresponding performance diagrams, will now be described in embodiments. The process of FIG. 2 assumes that the host system will be pushed with enough work to meet the system specification, as the system would be underutilized during data sampling if the system is not meeting the specification.

Figure 3:
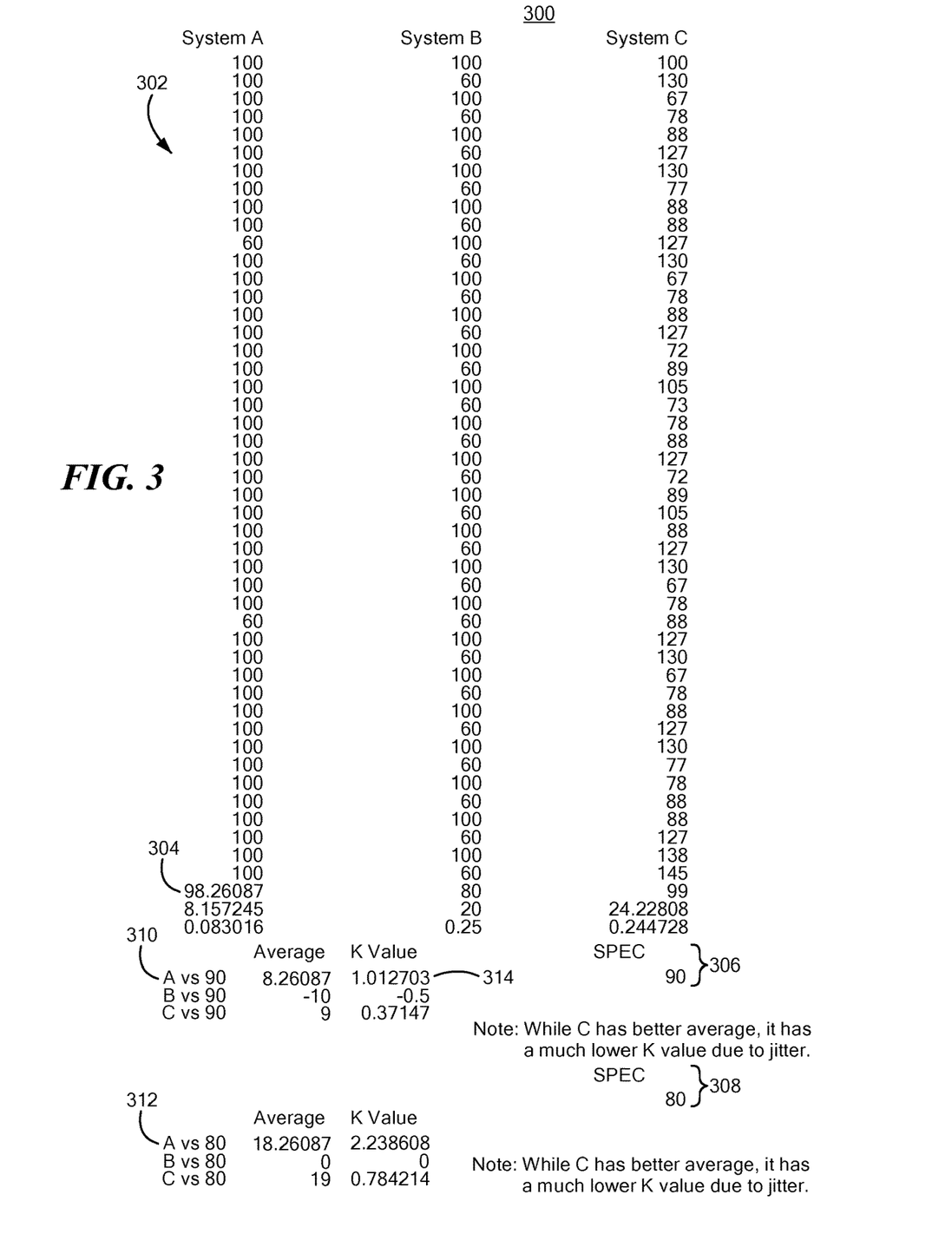
FIG. 3 is a diagram depicting sampled data for three systems and processed by the storage system performance evaluation and comparison processes in accordance with an embodiment.

At block 202, a set of data points is sampled, over the course of a sampling period, for a workload running on system. As shown in FIG. 3, data points have been sampled for a system A 302. The data points indicate a performance metric with respect to operational characteristics of the system. In embodiments, various types of performance metrics can be evaluated. For example, the performance metric may be operating bandwidth of the system when the workload is synthetic, or known. In another embodiment, the performance metric may be a function of latency and bandwidth. As shown in FIG. 3, a set (forty-six samples) of sampled data points 302 are shown for a workload executed on system A.

At block 204, As shown, for example, in FIG. 3, the average taken for the sampled data for System A is shown generally at 304 as 98.26087.

At block 204, a system specification (SPEC) value is subtracted from each of the sampled data points. In embodiments, the specification value may be a system-defined value representing a minimum required bandwidth for an average workload or for a peak workload. In alternative embodiments, the specification value may be an operator-defined value representing a minimum required bandwidth for an average workload or for a peak workload. Two system specification values are shown in FIG. 3 by way of non-limiting illustration. A first specification value is 90 (306) and a second specification value is 80 (308).

The subtraction performed in block 204 produces deviation values reflecting a deviation of each of the sampled data points from the specification value.

At block 206, an average is taken for the deviation values. By way of illustration, using a specification value of 90 (306), FIG. 3 shows resulting averages of the deviation values: 8.26087 for System A, −10 for System B, and 9 for System C (310), and using a specification value of 80, FIG. 3 shows resulting averages of the deviation values: 18.26087 for System A, 0 for System B, and 19 for System C (312), for corresponding workloads.

At block 208, a standard deviation of the sampled data points is calculated. A square root of the variance value produces the standard deviation. Under general randomness assumptions, this provides a normal distribution and is a good measure of how uniform the sampled data is (i.e., how scattered the data is around the average value) regardless of its deviation from the expected specification value.

At block 210, the averaged deviation value is divided by the standard deviation, thereby producing a modified performance value that accounts for a deviation in the operational characteristics of the system over the sampling period. As shown in FIG. 3, e.g., a modified performance value (shown as "k") is generally shown at 314 for system A. A modified performance value of −0.5 is shown for System B, and a modified performance value of 0.37147 is shown for System C based on a system specification of 90 (306). Thus, as can be seen in FIG. 3, there is a substantial difference between taking the average of sampled data points (e.g., 98.26087 for System A) 304, which implies that the system performance is running well and calculating the modified performance value (e.g., 1.012703 for System A) in assessing actual system performance that accounts for fluctuations.

At block 212, the modified performance value is compared to a benchmark performance value. In some embodiments, the resulting modified performance value can be used to provide recommendation of an action to be taken with respect to the affected system. If the modified performance value reflects poor performance, the recommendation could be to correct some problem, mitigate a performance issue, or some action to improve the modified performance value. The modified performance value could be used to modify service contracts, subsidize a service contract, or other similar action. Other actions may include an automated feature that initiates a call or help ticket.

As indicated above, the exemplary performance evaluation and comparison techniques provide a way to compare system performance for the same system (e.g., two workloads executed on the same system at two different points in time. In alternative embodiments, the exemplary techniques provide a way to compare system performance for workloads executing on the same system with different improvements (e.g., code levels) applied between executions. In further embodiments, the exemplary techniques provide a way to compare system performance for comparable workloads executed on two separate systems (e.g., taking jitter into account).

In comparing two different workloads, the exemplary techniques include sampling data points for a second workload, where each of the data points indicate a performance metric with respect to operational characteristics. A system specification value is subtracted from each of the sampled data points, thereby producing deviation values reflecting a deviation of the sampled data points from the systems specification value, an average is taken of the deviation values, a standard deviation of the sampled data points is calculated, and the averaged deviation value is divided by the standard deviation, thereby producing a modified performance value that accounts for a deviation in the operational characteristics of the system over the sampling period. The modified performance value of the first workload is compared with the modified performance value of the second workload.

As shown in FIG. 3, three systems A, B, and C may be evaluated and compared. The process described above in FIG. 2 with respect to system A is performed for each of systems B and C. Sample averages and corresponding data are shown in FIG. 3.

Figure 2:
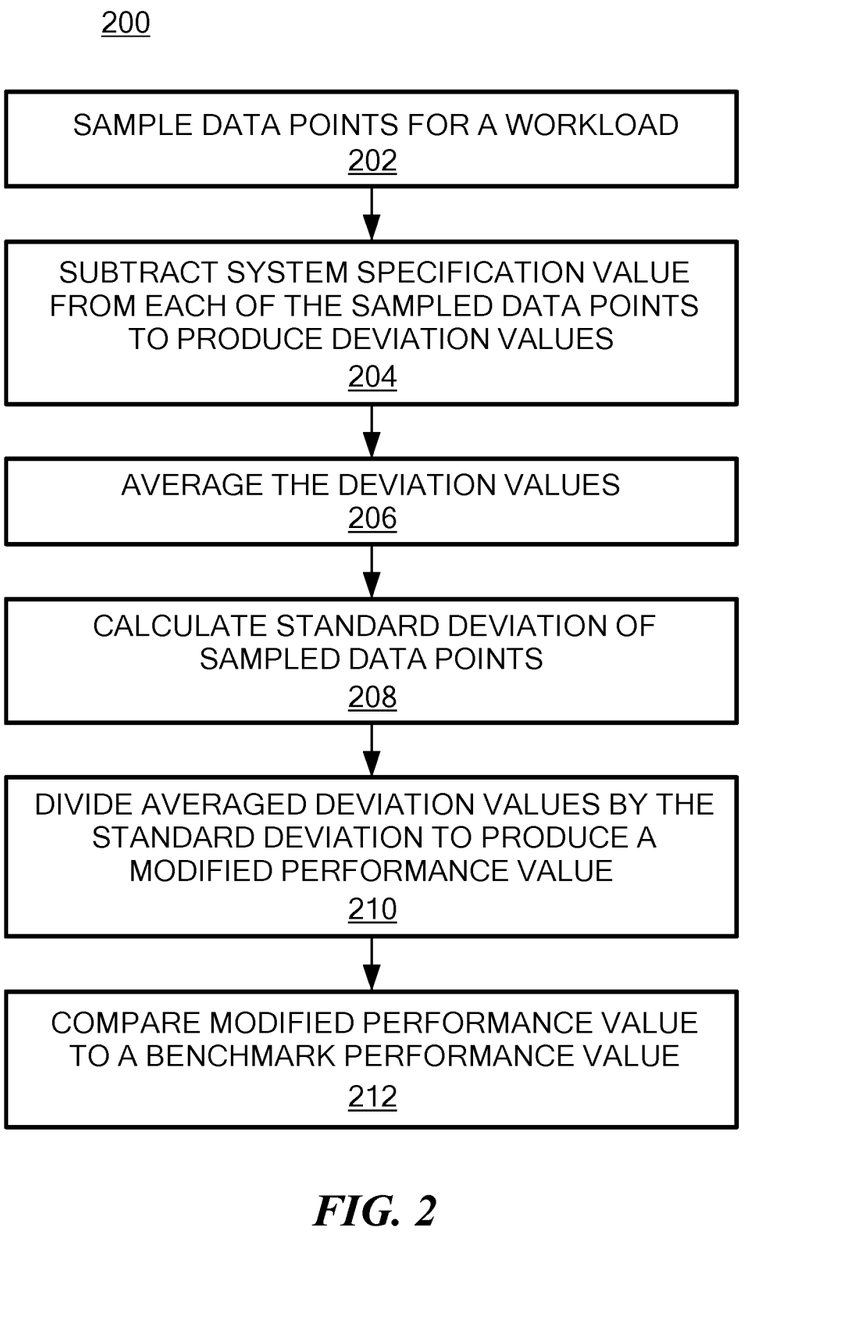
FIG. 2 is a flow diagram of a process for performing storage system performance evaluation and comparison in accordance with an embodiment.
Figure 4A:
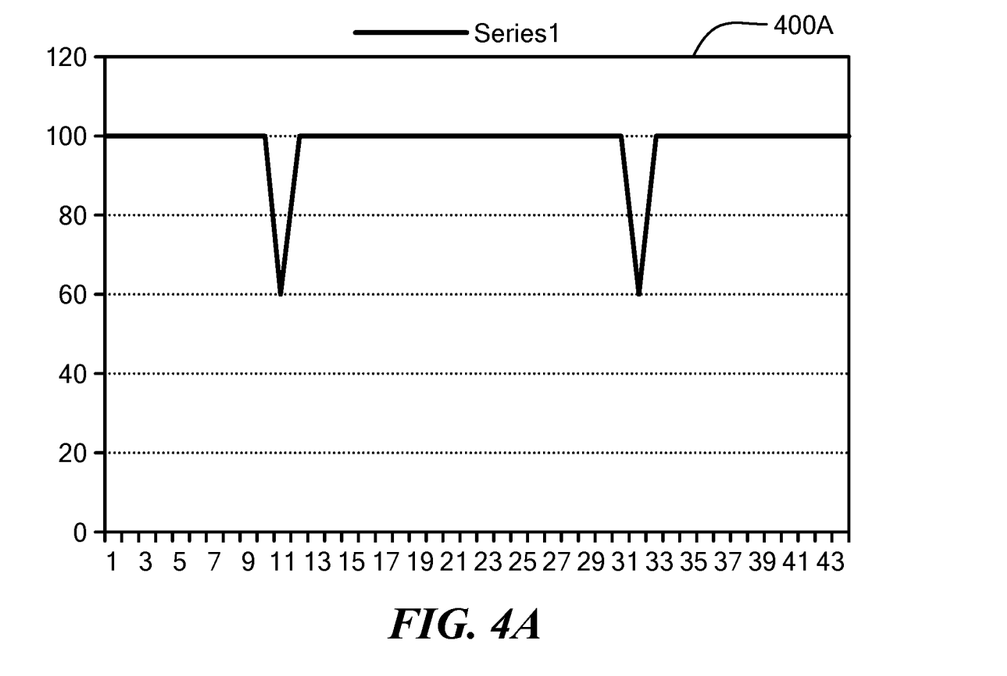
FIG. 4A is a graph depicting sampled data for a first system of the three systems shown in FIG. 3, in accordance with an embodiment.
Figure 4B:
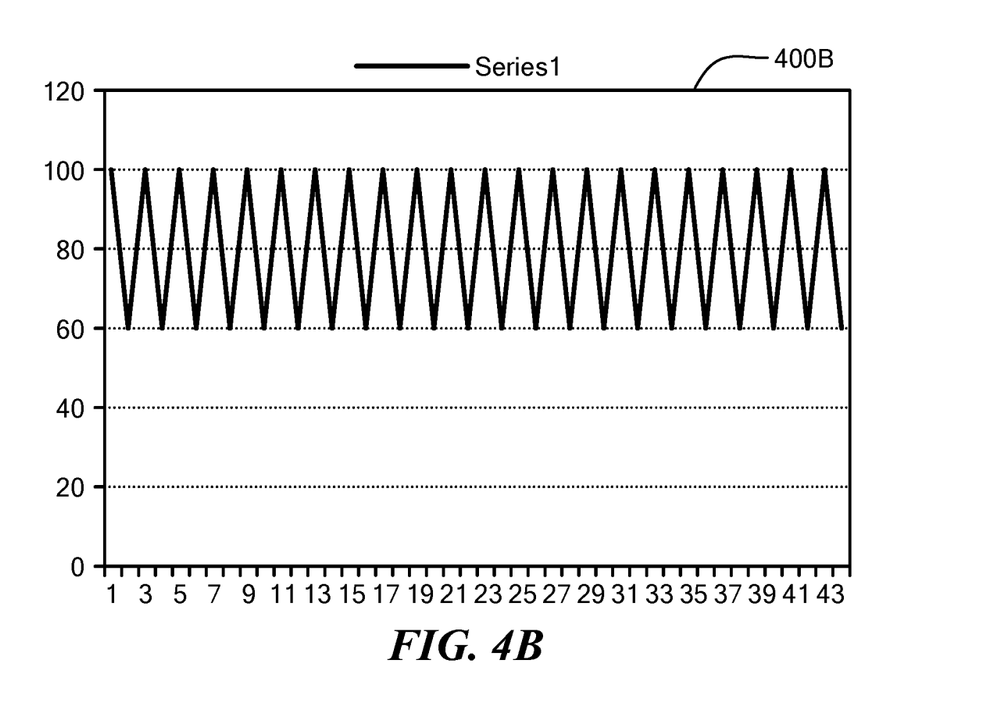
FIG. 4B is a graph depicting sampled data for a second system of the three systems shown in FIG. 3, in accordance with an embodiment.
Figure 4C:
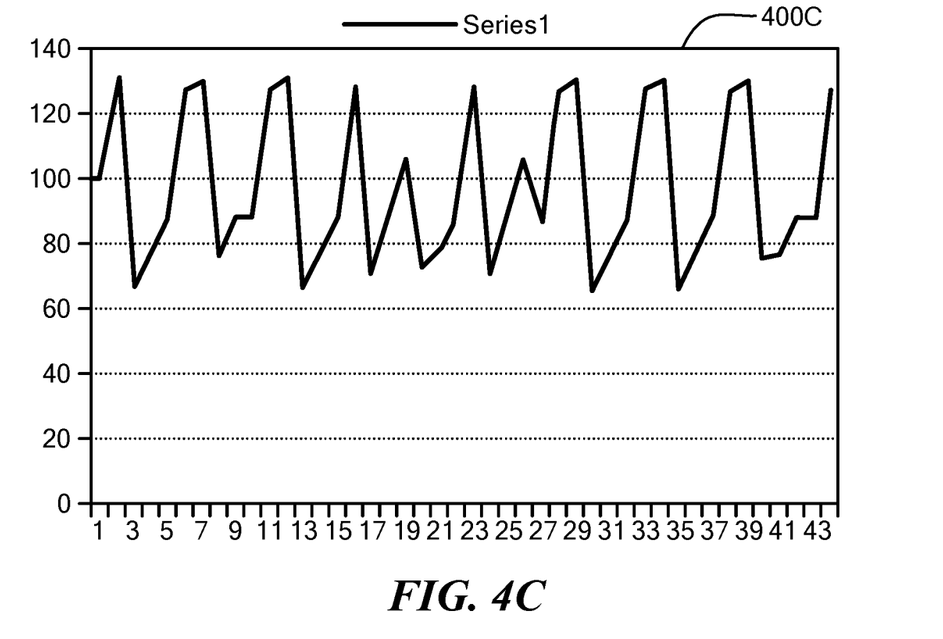
FIG. 4C is a graph depicting sampled data for a third system of the three systems shown in FIG. 3, in accordance with an embodiment.

As can be seen in the diagrams 400A-400C of FIG. 4, there is great variability in performance of the systems, which variability is accounted for in the modified performance value derived from the techniques described in FIG. 2. For example, as shown in FIG. 3, System C has a higher (better) average than Systems A and B; however, it has a much lower modified performance value than Systems A and B due to jitter.

Figure 5:
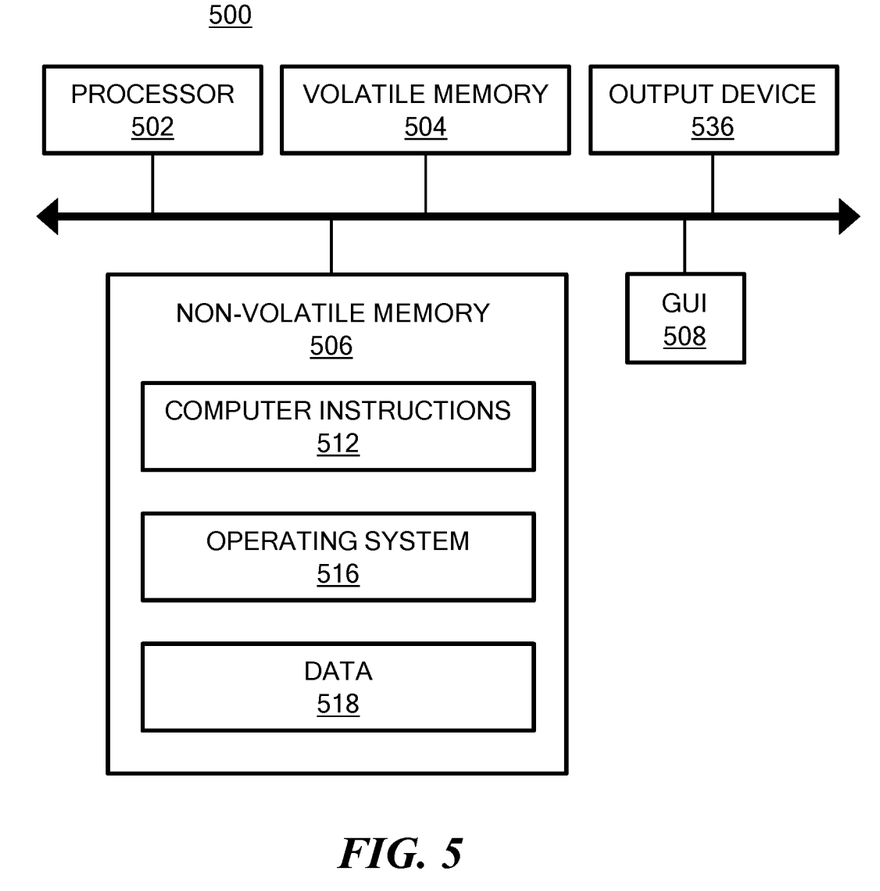
FIG. 5 is a block diagram of a hardware device that may perform the storage system performance evaluation and comparison processes in accordance with an embodiment.

Referring to FIG. 5, a computer 500 may include processor 502, volatile memory 504 (e.g., RAM), non-volatile memory 506 (e.g., a hard disk drive, solid state drive such as a flash drive, a hybrid magnetic and solid state drive, etc.), graphical user interface (GUI) 508 (e.g., a mouse, a keyboard, a display, and so forth) and input/output (I/O) device (not shown). Non-volatile memory 506 stores computer instructions 512, an operating system 516 and data 518 such that, for example, the computer instructions 512 are executed by the processor 502 out of volatile memory 504 to perform at least a portion of the process 200 shown in FIG. 2. Program code may be applied to data entered using an input device of GUI 508 or received from the I/O device.

Process 200 shown in FIG. 2 is not limited to use with the hardware and software of FIG. 5 and may find applicability in any computing or processing environment and with any type of machine or set of machines that is capable of running a computer program. Process 200 shown in FIG. 2 may be implemented in hardware, software, or a combination of the two.

The processes described herein are not limited to the specific embodiments described. For example, process 200 is not limited to the specific processing order shown in FIG.

2. Rather, any of the blocks of process 200 may be re-ordered, combined or removed, performed in parallel or in serial, as necessary, to achieve the results set forth herein.

Processor 502 may be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals. In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

In the above-described flow chart of FIG. 2, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagram does not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Figure 6:
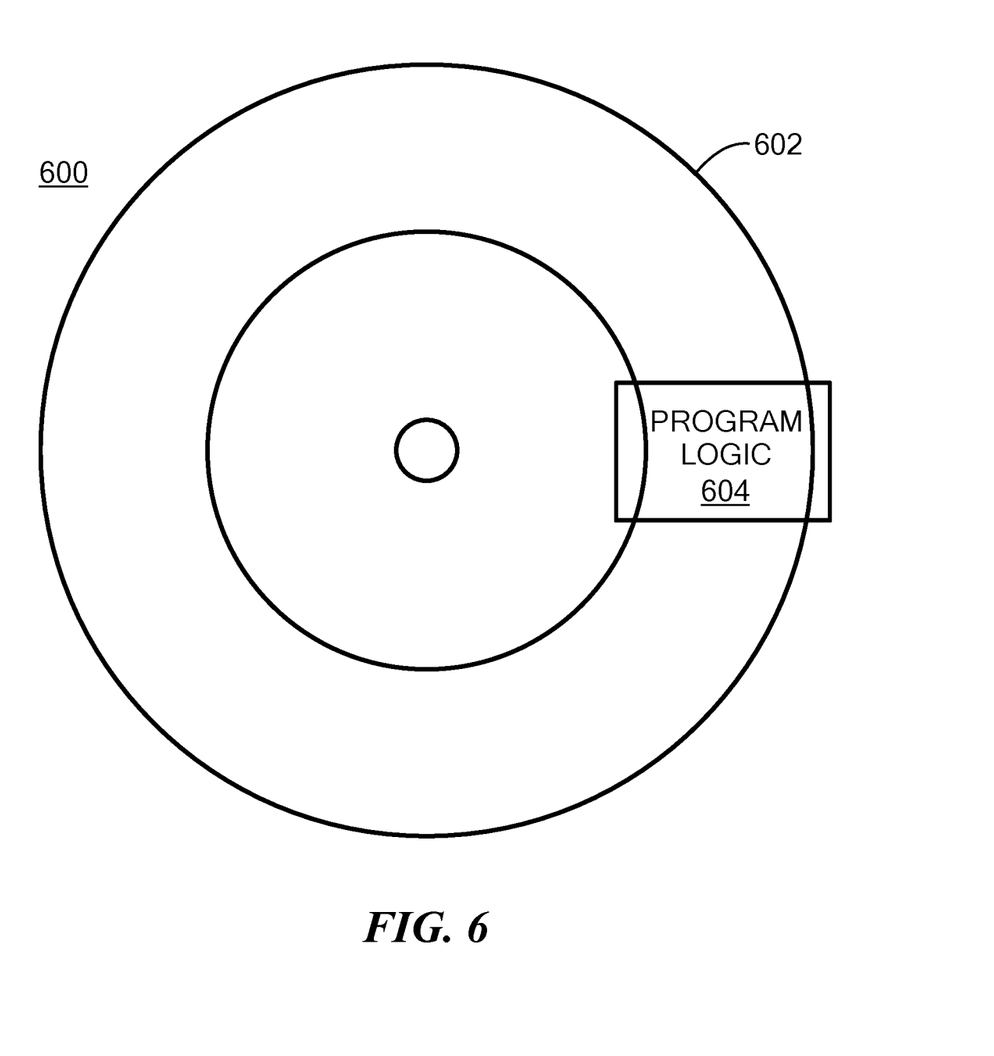
FIG. 6 is a simplified block diagram of an apparatus that may be used to implement at least a portion of the systems of FIGS. 1 and 5 and at least a portion of the process of FIG. 2 in accordance with an embodiment.

For example, when the program code is loaded into and executed by a machine, such as the computer of FIG. 5, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 6 shows Program Logic 604 embodied on a computer-readable medium 602 as shown, and wherein the Logic is encoded in computer-executable code configured for carrying out the reservation service process of this invention and thereby forming a Computer Program Product 600. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
   sampling data points for a workload running on a system over a sampling period, the data points indicating a performance metric with respect to operational characteristics of the system;
   subtracting a system specification value from each of the sampled data points, the subtracting producing deviation values reflecting a deviation of each of the sampled data points from the system specification value;
   averaging the deviation values with respect to the sampled data points;
   calculating a standard deviation of the sampled data points;
   dividing the averaged deviation values by the standard deviation, the dividing producing a modified performance value that accounts for a deviation in the operational characteristics of the system over the sampling period;
   comparing the modified performance value to a benchmark performance value; and
   implementing an action to be taken with respect to the system based on results of the comparing.

2. The method of claim 1, wherein the performance metric is operating bandwidth and the workload is synthetic.

3. The method of claim 1, wherein the performance metric is a function of latency and bandwidth.

4. The method of claim 1, wherein the system specification value is a system-defined value representing minimum required bandwidth for an average workload.

5. The method of claim 1, wherein the system specification value is a system-defined value representing minimum required bandwidth for a peak workload.

6. The method of claim 1, further comprising:
   sampling data points for a second workload, each of the data points indicating a performance metric with respect to operational characteristics;
   for the sampled data points of the second workload:
      subtracting a system specification value from each of the sampled data points, the subtracting producing deviation values reflecting a deviation of each of the sampled data points from the system specification value;
      averaging the deviation values with respect to the sampled data points;
      calculating a standard deviation of the sampled data points;
      dividing the averaged deviation values by the standard deviation, the dividing producing a modified performance value that accounts for a deviation in the operational characteristics of the system over the sampling period; and
   comparing the modified performance value of the first workload with the modified performance value of the second workload.

7. The method of claim 6, wherein the second workload is one of:
   a similarly configured workload running subsequent to the workload on the system;
   a workload running on the system subsequent to updates made to system code levels between execution of the first workload and the second workload; and
   a workload operating on a second system.

8. A system comprising:
   a memory comprising computer-executable instructions; and
   a processor executing the computer-executable instructions, the computer-executable instructions when executed by the processor cause the processor to perform operations comprising:
      sampling data points for a workload running on a system over a sampling period, the data points indicating a performance metric with respect to operational characteristics of the system;
      subtracting a system specification value from each of the sampled data points, the subtracting producing deviation values reflecting a deviation of each of the sampled data points from the system specification value;
      calculating a standard deviation of the sampled data points;

dividing the averaged deviation values by the standard deviation, the dividing producing a modified performance value that accounts for a deviation in the operational characteristics of the system over the sampling period;

comparing the modified performance value to a benchmark performance value; and implementing an action to be taken with respect to the system based on results of the comparing.

9. The system of claim 8, wherein the performance metric is operating bandwidth and the workload is synthetic.

10. The system, of claim 8, wherein the performance metric is a function of latency and bandwidth.

11. The system of claim 8, wherein the system specification value is a system-defined value representing minimum required bandwidth for an average workload.

12. The system of claim 8, wherein the system specification value is a system-defined value representing minimum required bandwidth for a peak workload.

13. The system of claim 8, wherein the operations further comprise:

sampling data points for a second workload, each of the data points indicating a performance metric with respect to operational characteristics;

for the sampled data points of the second workload:
subtracting a system specification value from each of the sampled data points, the subtracting producing deviation values reflecting a deviation of each of the sampled data points from the system specification value;

averaging the deviation values with respect to the sampled data points;

calculating a standard deviation of the sampled data points;

dividing the averaged deviation values by the standard deviation, the dividing producing a modified performance value that accounts for a deviation in the operational characteristics of the system over the sampling period; and comparing the modified performance value of the first workload with the modified performance value of the second workload.

14. The system of claim 13, wherein the second workload is one of:

a similarly configured workload running subsequent to the workload on the system;

a workload running on the system subsequent to updates made to system code levels between execution of the first workload and the second workload; and a workload operating on a second system.

15. A computer program product embodied on a non-transitory computer readable medium, the computer program product including instructions that, when executed by a computer, causes the computer to perform operations comprising:

sampling data points for a workload running on a system over a sampling period, the data points indicating a performance metric with respect to operational characteristics of the system;

subtracting a system specification value from each of the sampled data points, the subtracting producing deviation values reflecting a deviation of each of the sampled data points from the system specification value;

averaging the deviation values with respect to the sampled data points;

calculating a standard deviation of the sampled data points;

dividing the averaged deviation values by the standard deviation, the dividing producing a modified performance value that accounts for a deviation in the operational characteristics of the system over the sampling period;

comparing the modified performance value to a benchmark performance value; and implementing an action to be taken with respect to the system based on results of the comparing.

16. The computer program product of claim 15, wherein the performance metric is at least one of:

operating bandwidth and the workload is synthetic; and a function of latency and bandwidth.

17. The computer program product of claim 15, wherein the system specification value is a system-defined value representing minimum required bandwidth for an average workload.

18. The computer program product of claim 15, wherein the system specification value is a system-defined value representing minimum required bandwidth for a peak workload.

19. The computer program product of claim 15, wherein the operations further comprise:

sampling data points for a second workload, each of the data points indicating a performance metric with respect to operational characteristics;

for the sampled data points of the second workload:
subtracting a system specification value from each of the sampled data points, the subtracting producing deviation values reflecting a deviation of each of the sampled data points from the system specification value;

calculating a standard deviation of the sampled data points;

dividing the averaged deviation values by the standard deviation, the dividing producing a modified performance value that accounts for a deviation in the operational characteristics of the system over the sampling period; and comparing the modified performance value of the first workload with the modified performance value of the second workload.

20. The computer program product of claim 19, wherein the second workload is one of:

a similarly configured workload running subsequent to the workload on the system;

a workload running on the system subsequent to updates made to system code levels between execution of the first workload and the second workload; and a workload operating on a second system.

* * * * *